US012754699B2

(12) United States Patent
Imai

(10) Patent No.: US 12,754,699 B2
(45) Date of Patent: Oct. 6, 2026

(54) PRINT CONTROL APPARATUS, PRINTING SYSTEM, PRINT CONTROL METHOD, AND NON-TRANSITORY COMPUTER-READABLE STORAGE MEDIUM STORING PRINT CONTROL PROGRAM

(71) Applicant: SEIKO EPSON CORPORATION, Tokyo (JP)

(72) Inventor: Ryoya Imai, Sapporo (JP)

(73) Assignee: SEIKO EPSON CORPORATION, Tokyo (JP)

(*) Notice: Subject to any disclaimer, the term of this patent is extended or adjusted under 35 U.S.C. 154(b) by 253 days.

(21) Appl. No.: 18/588,340

(22) Filed: Feb. 27, 2024

(65) Prior Publication Data

US 2024/0295996 A1 Sep. 5, 2024

(30) Foreign Application Priority Data

Mar. 2, 2023 (JP) ................................ 2023-031672

(51) Int. Cl.
*G06F 3/12* (2006.01)

(52) U.S. Cl.
CPC ............ *G06F 3/121* (2013.01); *G06F 3/1232* (2013.01); *G06F 3/1235* (2013.01); *G06F 3/1285* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 2005/0147440 A1* | 7/2005 | Nakanishi | .......... | G06K 15/1823 400/62 |
| 2007/0273912 A1* | 11/2007 | Maurin | ............ | G07B 17/00508 358/1.14 |
| 2022/0137903 A1 | 5/2022 | Morales | | |

FOREIGN PATENT DOCUMENTS

| | | |
|---|---|---|
| JP | 2022075636 A | 5/2022 |

* cited by examiner

*Primary Examiner* — Jacky X Zheng
(74) *Attorney, Agent, or Firm* — CHIP LAW GROUP

(57) ABSTRACT

A print control apparatus includes an instruction reception section configured to receive an instruction to perform batch printing of a plurality of print files, a calculation section configured to calculate, based on the plurality of print files, a predicted consumption of consumables required for batch printing of the plurality of print files, a consumable remaining amount acquisition section configured to obtain a consumable remaining amount from a printer, a determination section configured to determine, based on the predicted consumption and the consumable remaining amount, whether or not it is possible to perform batch printing without replacing the consumable, and a notification section configured to give a user a notification based on a determination result.

7 Claims, 7 Drawing Sheets

FIG. 6

| PRINTER | PRINT SETTING | BATCH PRINTING ENABLED/DISABLED | RECOMMENDATION |
|---|---|---|---|
| printer_001 | setting1 | ENABLED | RECOMMENDED |
| | setting2 | DISABLED | — |
| printer_002 | setting1 | DISABLED | — |
| | setting21 | DISABLED | — |
| | ... | ... | ... |
| printer_003 | setting3 | ENABLED | — |
| | ... | ... | ... |
| ... | ... | ... | ... |

PRINT CONTROL APPARATUS, PRINTING SYSTEM, PRINT CONTROL METHOD, AND NON-TRANSITORY COMPUTER-READABLE STORAGE MEDIUM STORING PRINT CONTROL PROGRAM

The present application is based on, and claims priority from JP Application Serial Number 2023-031672, filed Mar. 2, 2023, the disclosure of which is hereby incorporated by reference herein in its entirety.

BACKGROUND

1. Technical Field

The present disclosure relates to a print control apparatus, a printing system, a print control method, and a non-transitory computer-readable storage medium storing a print control program.

2. Related Art

JP-A-2022-75636 describes a technique for calculating an estimated total amount of ink necessary for printing a mixed print job including a plurality of print jobs and transmitting the estimated total amount of ink to a client terminal.

However, a problem remains in that it is difficult for a user to know whether or not batch printing of a plurality of files is possible.

SUMMARY

According to an aspect of the present disclosure, a print control apparatus includes an instruction reception section configured to receive an instruction to perform batch printing of a plurality of print files, a calculation section configured to calculate, based on the plurality of print files, a predicted consumption of consumables required for batch printing of the plurality of print files, a consumable remaining amount acquisition section configured to obtain a consumable remaining amount from a printer, a determination section configured to determine, based on the predicted consumption and the consumable remaining amount, whether or not it is possible to perform batch printing without replacing the consumables, and a notification section configured to give a user a notification based on a determination result.

According to an aspect of the present disclosure, a printing system includes a print control apparatus, a printer that obtains a consumable remaining amount and returns the consumable remaining amount in accordance with control of the print control apparatus, and a terminal that performs display in accordance with information transmitted from the print control apparatus and transmits to the print control apparatus an instruction input by a user. The print control apparatus includes an instruction reception section that receives an instruction transmitted from the terminal to perform batch printing of a plurality of print files, a calculation section that calculates, based on the plurality of print files, a predicted consumption of consumables required for batch printing of the plurality of print files, a consumable remaining amount acquisition section that obtains the consumable remaining amount from the printer, a determination section that determines, based on the predicted consumption and the consumable remaining amount, whether or not it is possible to perform batch printing without replacing the consumables, and a notification section that transmits to the terminal a notification based on a determination result.

According to an aspect of the present disclosure, a print control method includes receiving an instruction to perform batch printing of a plurality of print files, calculating, based on the plurality of print files, a predicted consumption of consumables required for batch printing of the plurality of print files, obtaining a consumable remaining amount from a printer, determining, based on the predicted consumption and the consumable remaining amount, whether or not it is possible to perform batch printing without replacing the consumables, and giving a user a notification based on a determination result.

According to an aspect of the present disclosure, a non-transitory computer-readable storage medium stores a print control program. The print control program causes a computer to perform functions including: an instruction reception section configured to receive an instruction to perform batch printing of a plurality of print files, a calculation section configured to calculate, based on the plurality of print files, a predicted consumption of consumables required for batch printing of the plurality of print files, a consumable remaining amount acquisition section configured to obtain a consumable remaining amount from a printer, a determination section configured to determine, based on the predicted consumption and the consumable remaining amount, whether or not it is possible to perform batch printing without replacing the consumables, and a notification section configured to give a user a notification based on a determination result.

BRIEF DESCRIPTION OF THE DRAWINGS

FIG. 6 is a diagram illustrating an example of a determination result of the batch print determination processing.

DESCRIPTION OF EMBODIMENTS

Embodiments of the present disclosure are described in the following order.

1. System Configuration
1.1 Server Configuration
1.2 Terminal Configuration
1.3 Printer Configuration
2. Batch Print Processing
3. Other Embodiments

1. System Configuration

Figure 1:
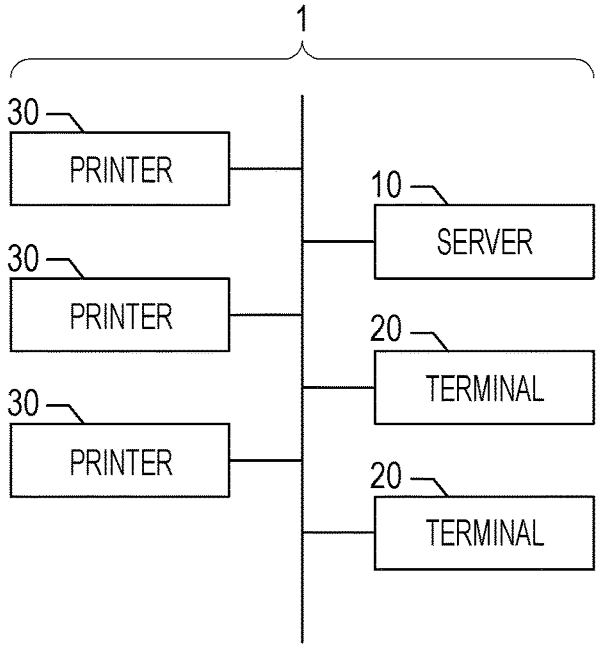
FIG. 1 is a block diagram of a printing system.

FIG. 1 is a diagram schematically illustrating an example of a printing system according to an embodiment of the present disclosure. The printing system 1 includes a server 10, terminals 20, and printers 30. In the present embodiment, the number of devices illustrated in FIG. 1 is an example and is not limited thereto. For example, the numbers of the terminals 20 and the printers 30 that are illustrated in FIG.

1 are not limited to the respective numbers illustrated in FIG. 1, and two or more servers 10 may be included instead of one server 10 as illustrated. These devices are able to communicate with each other via various types of network. The network may be a local network, or the devices at physically distant locations may communicate with each other via the Internet or the like.

In the present embodiment, a user who performs printing work receives a request to produce a printed material from a requester. The user operates the terminal 20 to input information indicating the requested contents. The terminal 20 transmits the information to the server 10. The server 10 controls the printer 30 to produce the requested printed material.

In the present embodiment, the printing system 1 is a system that produces a printed material and performs printing in accordance with the files to be printed to produce the printed material. In this regard, of course, the printed material may be subjected to predetermined post-process, such as surface treatment or the like after the printing process.

At a site where printing work is performed, the function to perform batch printing of a plurality of files is required so that a vast amount of printing operations are performed smoothly. However, there is a problem in that it is necessary for a user to calculate the consumption of consumables, such as ink, a medium, and the like in advance at the time of printing a plurality of files, which may be a burden to the user. Also, there is a problem in that when the consumables run short in the middle of printing a print job, the consumables already used for a printed material that has failed become wasted. Also, when the consumables are replaced in advance so as not to run short in the middle of batch printing, unused consumables may be discarded, which causes a waste of the consumables in this case. Thus, the printing system 1 according to the present embodiment has a function of determining the possibility of batch printing of a plurality of files, the replacement time of the consumables in the middle of batch printing, and the like, and giving a notification to the user.

In the following, a description will be given of the configuration of each device of the printing system 1 that performs such functions.

1.1 Server Configuration

Figure 2:
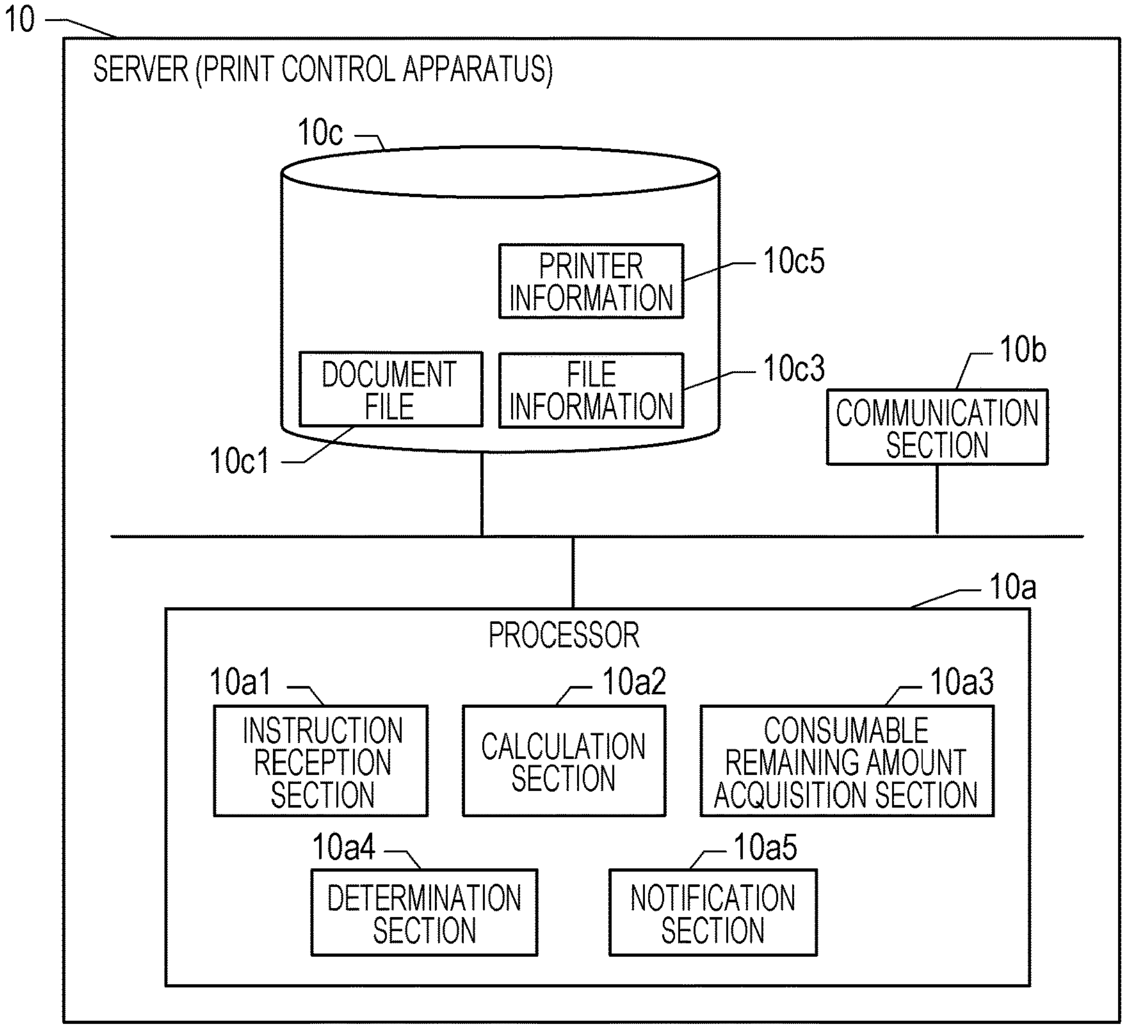
FIG. 2 is a block diagram of a server.

FIG. 2 is a block diagram illustrating the configuration of the server 10. The server 10 includes a processor 10*a*, a communication section 10*b*, and a nonvolatile memory 10*c*. The processor 10*a* includes a CPU, a ROM, a RAM, and the like that are not illustrated in FIG. 2, and is able to execute various programs stored in the nonvolatile memory 10*c* so as to control each section of the server 10 and each device coupled to the network. In this regard, the processor 10*a* may be configured by a single chip, by multiple chips, or as a SoC with various functional blocks for operating the server. Also, for example, an ASIC may be employed instead of the CPU, or the CPU and an ASIC may work in combination. When each device according to the present embodiment includes a processor, the processor is able to be realized in various modes in the same manner as the processor 10*a*.

The communication section 10*b* includes a communication interface for communicating with an external device in accordance with various wired or wireless communication protocols. The server 10 is able to communicate with another device via the communication section 10*b*. In this regard, the communication section 10*b* may include an interface for communicating with various removable memories mounted on the server 10.

The nonvolatile memory 10*c* of the server 10 stores various kinds of information. For example, the nonvolatile memory 10*c* includes a document file 10*c*1. The document file 10*c*1 is a file that includes data indicating the contents to be printed for producing a printed material. For example, a pdf file or the like may be the document file 10*c*1.

Further, the nonvolatile memory 10*c* stores file information 10*c*3. The file information 10*c*3 includes a file name, delivery date and time, the number of copies, and the like of the file to be printed. Further, the nonvolatile memory 10*c* stores printer information 10*c*5. The printer information 10*c*5 includes, for each of a plurality of printers used for producing a printed material, information, such as the current status, print job being printed, waiting print jobs and processing orders thereof, the current medium remaining amount and ink remaining amount for each ink type, and registered print settings, and the like. An ink type is a type of ink color, for example, cyan, magenta, yellow, black, or the like, but may include various other colors. A print setting is a set of parameters for various setting items for printing.

The processor 10*a* generates various management screens for managing the individual processes for producing a printed material. A user of the terminal 20 browses the management screens by using a web browser of the terminal 20, and is able to input an instruction. The processor 10*a* is able to display, as one of the management screens, an input screen for inputting, to the server 10, the document file 10*c*1 to be printed, and a screen that displays, on the terminal 20, a list of the input plurality of document files 10*c*1 and receives an instruction to perform batch printing. The processor 10*a* functions as an instruction reception section 10*al* that receives an instruction to perform batch printing of a plurality of print files from the terminal 20 operated by the user.

Further, the processor 10*a* functions as a calculation section 10*a*2 that calculates a predicted consumption of consumables required for batch printing of a plurality of print files based on the plurality of print files instructed to print in batch. The detailed description will be given later of the function of the calculation section 10*a*2.

Further, the processor 10*a* functions as a consumable remaining amount acquisition section 10*a*3 that obtains a consumable remaining amount from the printer 30. The processor 10*a* is able to obtain the remaining amount for each ink type and the remaining amount of a medium from each of the printers 30 under the control of the server 10. The processor 10*a* stores the obtained remaining amount in the printer information 10*c*5.

Further, the processor 10*a* functions as a determination section 10*a*4 that determines whether or not it is possible to perform batch printing without replacing the consumables based on the predicted consumption and the consumable remaining amount. The processor 10*a* determines whether or not it is possible to perform batch printing without replacing the consumables for each of the printers 30 under the control of the server 10 and for each of the print settings. When a print setting used for printing is different, printing is performed by using different parameters for various setting items and therefore the ink remaining amounts for respective ink types after printing may be different from each other. Accordingly, in the present embodiment, determinations are made for each of the printers for all the print settings that are able to be used.

Further, the processor 10*a* functions as a notification section 10*a*5 that gives a notification to the user of the terminal 20 based on a determination result. That is to say, in the present embodiment, the processor 10_a_ displays on the web browser of the terminal 20 whether or not it is possible to perform batch printing without replacing consumables for each printer and for each print setting, and gives a notification to the user. Also, when the consumable remaining amount becomes insufficient in the middle of batch printing, and replacement of the consumables is required, the processor 10_a_ notifies in advance the user that the replacement of the consumables occurs in the middle of batch printing. In this manner, it is possible for the user to recognize that it is necessary to replace the consumables in the middle of batch printing before starting the batch printing, and thus user is able to make a plan in advance to deal with the replacement work.

When the remaining consumables are running short in the middle of batch printing, and replacement of the consumables is required, the processor 10_a_ gives the printer 30 a print instruction of the printable print files before replacement and causes the printer to start batch printing. The processor 10_a_ notifies the terminal 20 that the replacement will take place after printing of the print files printable before replacement is completed. In this manner, it is possible to temporarily stop the batch printing before the consumables run short. Accordingly, it is possible to reduce the possibility of waste of ink and medium that is caused by a printing failure due to a shortage of the consumables. After the user replaces the consumables, the processor 10_a_ gives the printer 30 a print instruction of the remaining print files. In this manner, it is possible to cause the printer 30 to perform printing continued from the interrupted batch printing after replacement of the consumables.

Also, the processor 10_a_ identifies among a plurality of printers a printer having a minimum variation in the ink remaining amount for each ink type after batch printing, and notifies the user of the terminal 20 that the identified printer is a recommended printer. In this manner, by identifying a recommended printer and giving a notification, it is possible to easily synchronize the replacement time for a plurality of ink types and to reduce user's operation required to replace ink.

1.2 Terminal Configuration

Figure 3:
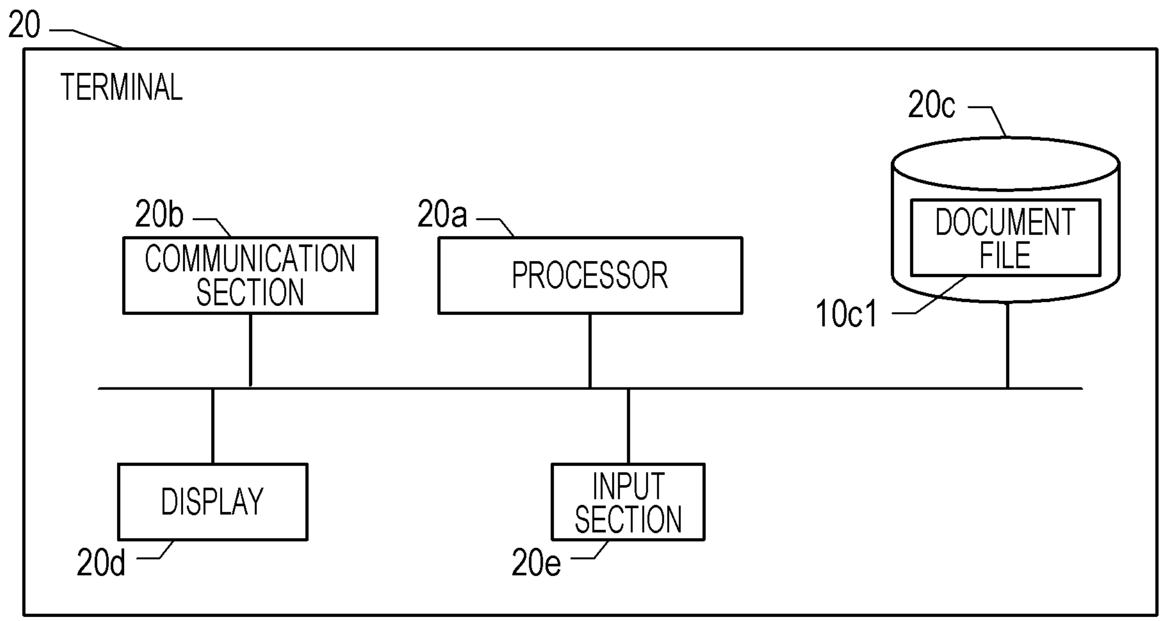
FIG. 3 is a block diagram of a terminal.

FIG. 3 is a block diagram illustrating the configuration of the terminal 20. The terminal 20 includes a processor 20_a_, a communication section 20_b_, a nonvolatile memory 20_c_, a display 20_d_, and an input section 20_e_. The processor 20_a_ includes a CPU, a ROM, a RAM, and the like, which are not illustrated in FIG. 3, and is able to execute various programs stored in the nonvolatile memory 20_c_ to control each section of the terminal 20.

The communication section 20_b_ includes a communication interface for communicating with an external device in accordance with various wired or wireless communication protocols. The terminal 20 is able to communicate with another device via the communication section 20_b_. Also, the communication section 20_b_ includes an interface for communicating with various removable memory of the terminal 20.

The nonvolatile memory 20_c_ of the terminal 20 stores the document file 10_c_1. The document file 10_c_1 may be stored in the nonvolatile memory 20_c_ in any manner. For example, the document file 10_c_1 provided by a requester who has requested production of a printed material may be stored in the removable memory, and the document file 10_c_1 may be transferred from the removable memory to the nonvolatile memory 20_c_ via the communication section 20_b_. Also, the document file 10_c_1 may be obtained from an external device via a network. Further, a user may use the terminal 20 to create the document file 10_c_1 by using an application program or the like, and store the document file 10_c_1 in the nonvolatile memory 20_c_. Of course, a document created by a requester may be edited by a user, and the document may be stored in the nonvolatile memory 20_c_ as the document file 10_c_1.

At the time of inputting an item, a user identifies the item by using the file name of the document file 10_c_1 stored in the nonvolatile memory 20_c_. When the item is input, the document file 10_c_1 is transferred to the server 10. In this regard, the file may be temporarily stored in the volatile memory of the terminal 20 and then transferred to the server 10 to be stored in the nonvolatile memory 10_c_ of the server 10 for a long term.

The display 20_d_ is a display device for displaying any image. The input section 20_e_ is constituted by a device for a user to perform an input operation, and includes, for example, a keyboard, a mouse, a touch panel, or the like. In any case, it is possible for the user to input their intention by operating the input section 20_e_ while viewing an image or text displayed on the display 20_d_. In the present embodiment, the user uses the display 20_d_ and the input section 20_e_ of the terminal 20 as a user interface to view various management screens created by the server 10 and input a necessary instruction.

1.3 Printer Configuration

Figure 4:
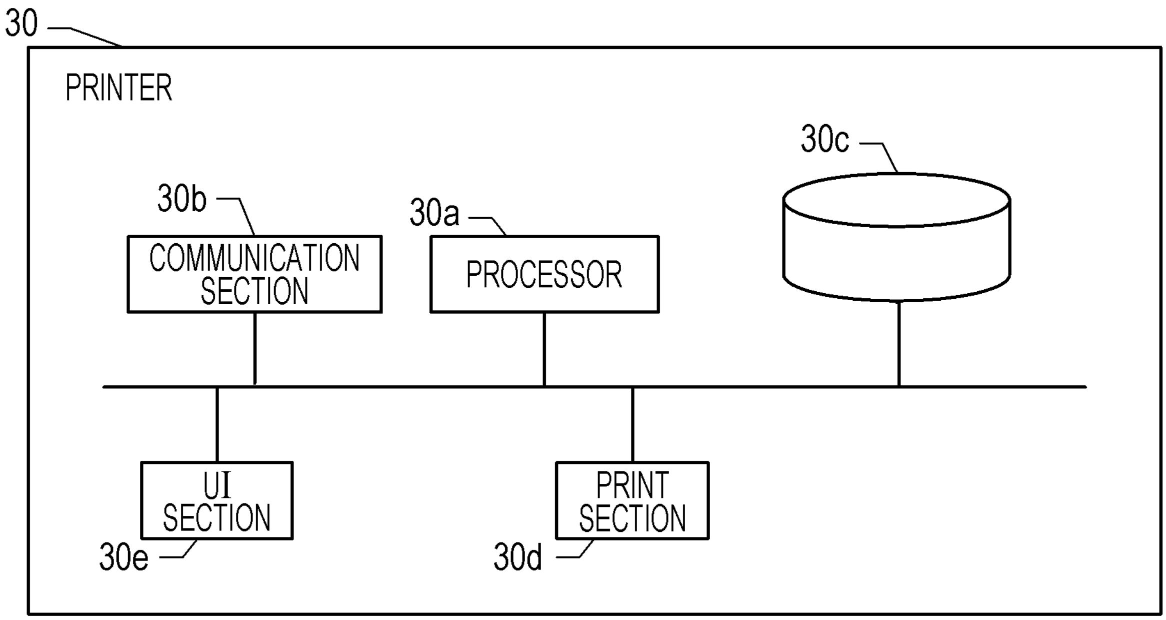
FIG. 4 is a block diagram of a printer.

FIG. 4 is a block diagram illustrating the configuration of the printer 30. The printer 30 includes a processor 30_a_, a communication section 30_b_, a nonvolatile memory 30_c_, a print section 30_d_, and a UI section 30_e_. The processor 30_a_ includes a CPU, a ROM, a RAM, and the like that are not illustrated in FIG. 4, and is able to execute various programs stored in the nonvolatile memory 30_c_ to control each section of the printer 30.

The communication section 30_b_ includes a communication interface for communicating with an external device in accordance with various wired or wireless communication protocols. The printer 30 is able to communicate with another device via the communication section 30_b_. In this regard, the communication section 30_b_ may include an interface for communicating with various removable memories mounted on the printer 30.

The print section 30_d_ is a section that performs printing, and may employ various printing methods, such as an ink jet method, an electrophotographic method, or the like. In the present embodiment, the ink jet method is assumed. The print section 30_d_ includes an actuator and various devices, a sensor, a drive circuit, a machine part, and the like for performing printing on various media. The sensor includes sensors that detect various detection targets that may change in the printer 30. The detection targets are not limited, and the sensors include, for example, a sensor that detects the remaining amount of a medium, a sensor that detects the remaining amount of ink for each ink type used for printing, and the like.

The UI section 30_e_ includes a touch panel display, various keys, a switch, and the like. The touch panel display includes a display panel that displays various kinds of information, for example, the status of the printer 30, the remaining amount of ink, and the like, and a touch detection panel that is laminated on the display panel and detects touch operation by a human finger or the like. The processor 30_a_ is able to obtain the contents of a user operation via the UI section 30*e*. Also, the processor 30*a* is able to display various kinds of information on the display of the UI section 30*e* to notify a user.

When the processor 30*a* of the printer 30 receives an acquisition request of the consumable remaining amount from the server 10, the processor 30*a* obtains the ink remaining amount for each ink color and the medium remaining amount based on the outputs of the respective sensors described above and returns the results to the server 10. Also, when the processor 30*a* detects, from the outputs of the respective sensors described above, that the ink and the medium have been replaced, the processor 30*a* notifies the server 10 of the completion of the replacement.

In the present embodiment, a plurality of printers 30 are installed in the facility owned by a printing service company, and individual files may be printed parallel in accordance with a plurality of requests from two or more requesters. The server 10 associates the processing order of the print job for files with the respective printers 30. When one of the printers 30 performs batch printing of a plurality of files, the server 10 associates a print job for the files with the one printer 30 in the processing order. The server 10 gives a start instruction to print the files in the processing order to the printer 30. The server 10 performs various kinds of image processing on the document file 10*c*1 to be printed based on the print setting and the like and outputs the print data indicating the contents to be printed to the printer 30 via the communication section 10*b*. The processor 30*a* of the printer 30 obtains the print data via the communication section 30*b* and controls the print section 30*d* based on the print data to perform printing. When the printing is completed, the processor 30*a* outputs the information indicating the completion of the printing to the server 10 via the communication section 30*b*. When the server 10 obtains the information via the communication section 10*b*, the processor 10*a* gives a print start instruction of the print job having the processing order next to print job that has completed printing.

2. Batch Print Processing

The processor 10*a* of the server 10 creates various screens for managing the individual production processes of a printed material in response to a management screen display request from the terminal 20 and transmits the display data of the screens to the terminal 20. The terminal 20 displays the screen on the web browser displayed on the display 20*d* of the terminal 20 based on the display data received from the server 10. When a user operates an input screen for files to be printed, specifies a file to be printed, and instructs to upload the file, the processor 20*a* of the terminal 20 transfers the file to be printed from the terminal 20 to the server 10. The processor 10*a* of the server 10 stores the file transmitted from the terminal 20 in the nonvolatile memory 10*c* as the document file 10*c*1. The user is able to perform various printing pre-processes on the document file 10*c*1 by operating the terminal 20. The processor 10*a* of the server 10 creates a screen indicating a list of the document files 10*c*1 stored in the server 10 and transmits the display data to the terminal 20 in response to the request from the user of the terminal 20. The current process for each file is displayed on the list screen. The user is able to individually give a print instruction to a file that has been pre-processed. However, the user is also able to give an instruction to perform batch printing of a plurality of files by one of the printers 30 to improve operational efficiency.

Figure 5:
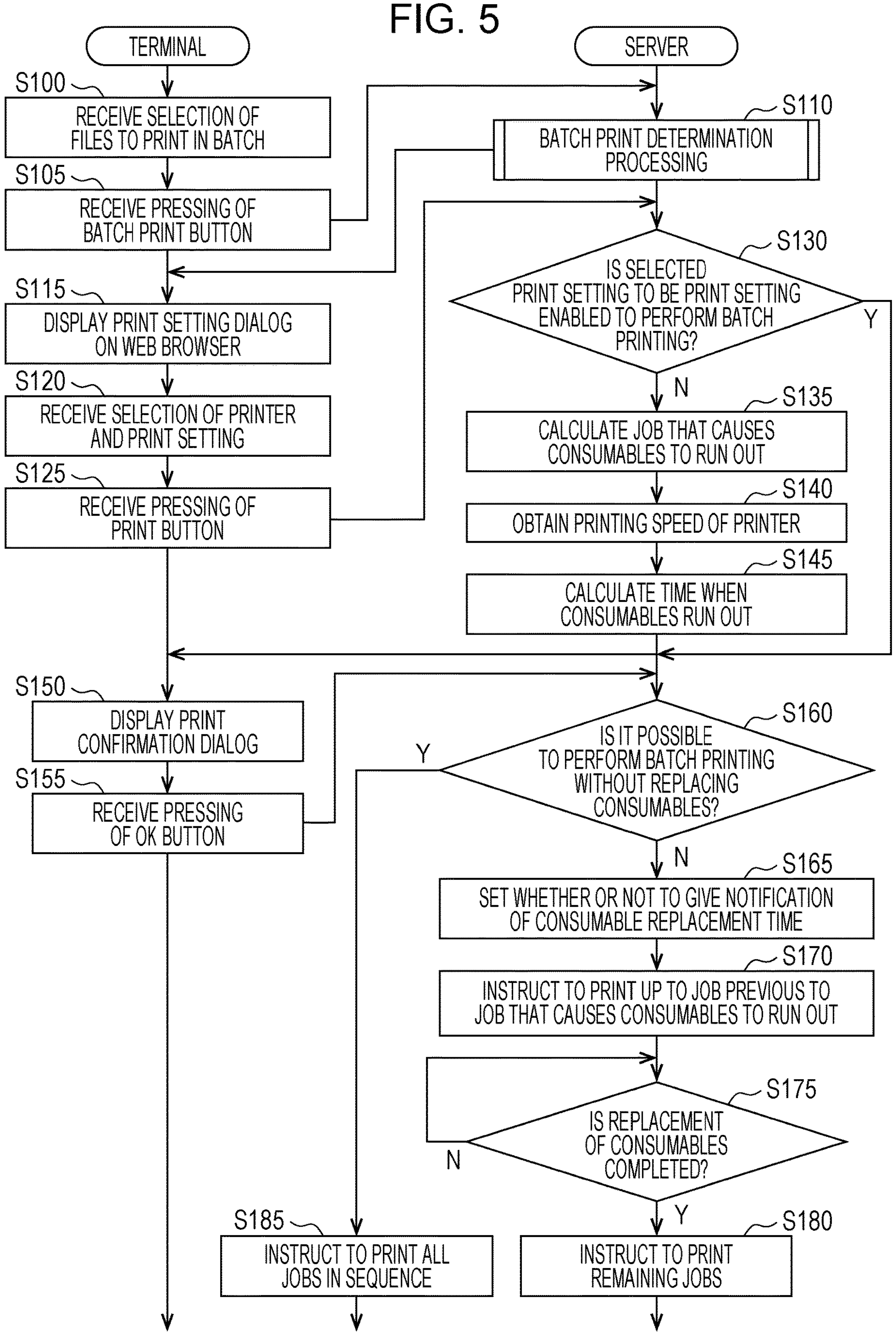
FIG. 5 is a flowchart of batch print processing.

FIG. 5 is a flowchart illustrating batch print processing. When the processor 20*a* of the terminal 20 receives selection of the files to print in batch (step S100) and receives the pressing of the batch printing button (step S105), the processor 20*a* transmits a batch print instruction of the selected files to the server 10. When the processor 10*a* of the server 10 receives the batch print instruction from the terminal 20, the processor 10*a* of the server 10 receives the instruction to perform batch printing of the selected plurality of files by the function of the instruction reception section 21*a* and performs batch print determination processing (step S110). For example, as illustrated in FIG. 6, the batch print determination processing is the processing for determining whether or not it is possible to perform batch printing of the selected plurality of files for each print setting and for each printer, and further determining a recommended printer. The detailed description will be given of the batch print determination processing later with reference to FIG. 8.

When the batch print determination processing of step S110 is completed, the processor 10*a* transmits a determination result of the batch print determination processing to the terminal 20 by the function of the notification section 10*a*5. As illustrated in FIG. 6, a determination result represents information illustrating whether or not batch printing is enabled for each printer and for each print setting.

Specifically, the processor 10*a* creates display data of a print setting dialog for giving a notification of the information based on the determination result and receiving the user setting on the batch printing, and transmits the display data of the print setting dialog to the terminal 20. Upon receiving the display data of the print setting dialog, the processor 20*a* of the terminal 20 displays the print setting dialog on the web browser (step S115).

Figure 7:
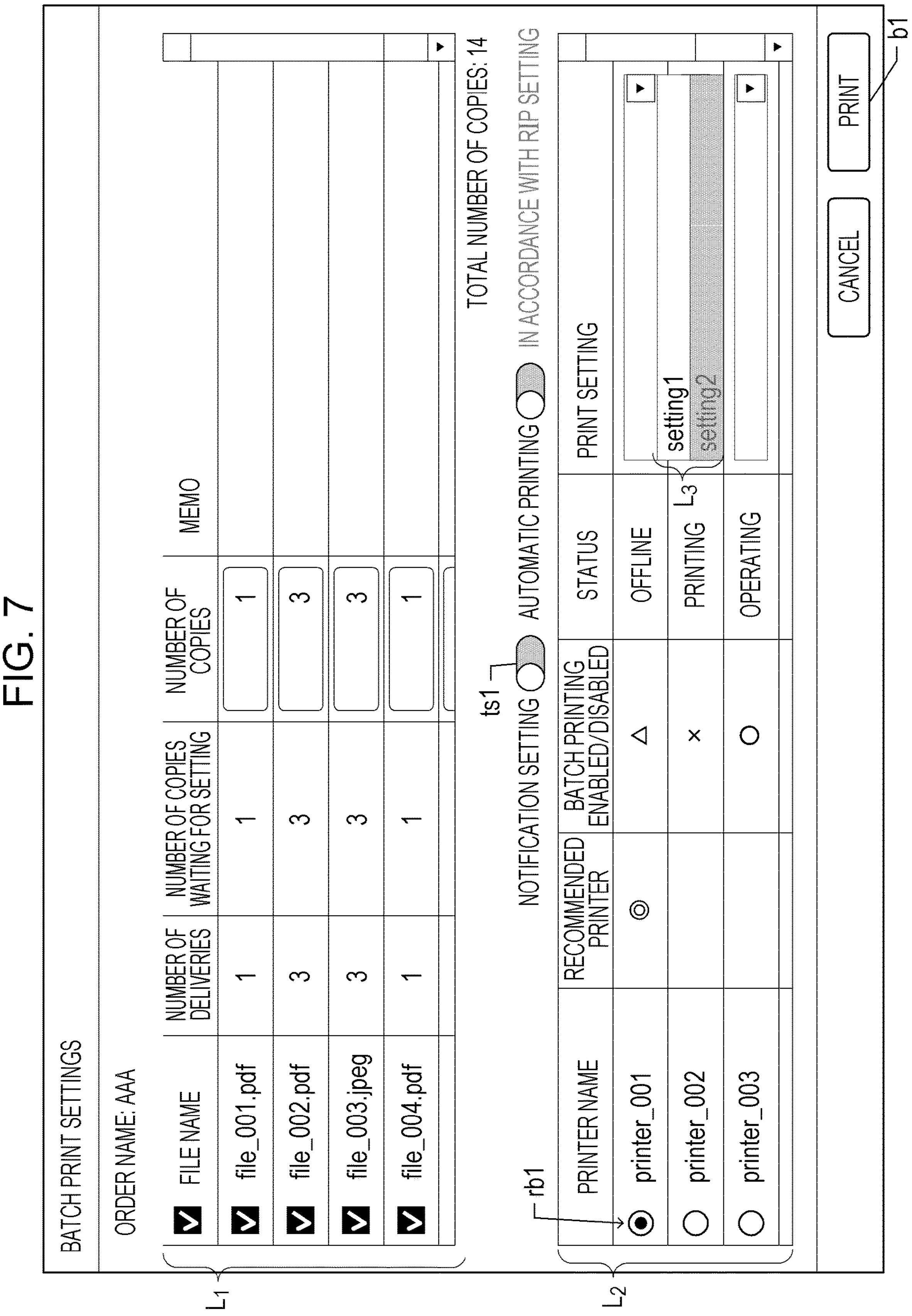
FIG. 7 is a diagram illustrating an example of a print setting dialog.

FIG. 7 is a diagram illustrating an example of the print setting dialog. The print setting dialog includes a list $L_1$ of files selected by the user as the targets of the batch printing and a list $L_2$ of printers 30 under the control of the server 10. On the list $L_1$ of files, the files are arranged in order of the processing of the batch printing (indicated that printing is to be performed from top to bottom). On the list $L_2$ of printers, any one of the printers is indicated as a recommended printer based on the determination result of the batch print determination processing. Also, whether batch printing is enabled or disabled is indicated for each printer. For a printer enabled to perform batch printing without replacing the consumables for all the print settings, a word or an icon (a circle mark in the example in FIG. 7) indicating so is displayed. For a printer which is enabled to perform batch printing without replacing the consumables by using a part of the print settings, but is disabled without replacing the consumables by using another part of the print settings (the printing is enabled when replacement takes place), a word or an icon (a triangle mark in the example in FIG. 7) indicating so is displayed. For a printer disabled to perform batch printing for all the print settings, a word or an icon (a cross mark in the example in FIG. 7) indicating so is displayed.

On the list $L_2$ of printers, radio buttons rb1 are displayed in association with the corresponding printers. It is possible for a user to select the radio button of any one of the printers so as to select the printer as a printer to perform batch printing.

Also, on the list $L_2$ of printers, a pull-down menu for selecting any one of the print settings registered for the printer is displayed for each printer. When the pull-down menu is operated for any printer, a list $L_3$ of all the print settings registered for the printer is displayed. In the batch print determination processing, a determination is made whether or not batch printing is enabled for each printer and for each print setting without replacing the consumables (for example, refer to FIG. 6). Accordingly, in the printer having a pull-down menu pulled down, the name of the print setting for which batch printing is disabled is displayed in a grayed-out manner. On the other hand, in the printer having a pull-down menu pulled down, the name of the print setting for which batch printing is enabled is not displayed in a grayed-out manner, but is displayed in the usual manner. In this manner, when the remaining consumables run short in the middle of batch printing, and replacement of the consumables is required, a notification that replacement of the consumables occurs in the middle is given in advance in the present embodiment. Accordingly, when the user selects the print setting, the user is able to recognize that replacement of the consumables is necessary in the middle of the batch printing in advance, and thus to promptly prepare the replacement work and the like.

In this regard, a switch ts1 for notification setting is a switch for setting whether or not to notify a smartphone of the replacement time. By setting the switch ts1 for the notification setting on, when a print setting that necessitates the consumable replacement is selected, the server 10 transmits a notification of replacement time to a smartphone registered in advance, for example, at a specified time before the replacement time.

Referring back to the flowchart in FIG. 5, the processor 20*a* of the terminal 20 receives the selection of a printer and a print setting in the print setting dialog (step S120). Next, upon receiving the pressing of the printing button b1 (step S125), the processor 20*a* transmits batch print setting information indicating that an instruction to perform batch printing with the selected printer and print setting to the server 10.

Upon receiving the batch print setting information, the processor 10*a* of the server 10 determines whether or not the selected print setting is a print setting enabled to perform batch printing by using the function of the determination section 10*a*4 (step S130). That is to say, the processor 10*a* of the server 10 determines whether or not the print setting in the printer selected in the batch print setting information is a print setting enabled to perform batch printing by referring to a determination result of the batch print determination processing as illustrated in FIG. 6.

In step S130, when the print setting is not determined as a print setting enabled to perform batch printing, the processor 10*a* calculates a job that causes the consumables to run out (step S135). Specifically, the processor 10*a* identifies a print job by which the accumulated value of the ink consumption of any ink type exceeds the ink remaining amount of the ink type when the print job for a plurality of files selected to be printed in batch by using the selected printer with the selected print setting is executed in the processing order. The ink consumption is able to be calculated by the same method as those in step S210 and S215 in FIG. 9 described later. Also, the processor 10*a* identifies a print job by which the accumulated value of the medium consumption exceeds the medium remaining amount when the print job for a plurality of files to be printed in batch are executed in the processing order. The medium consumption is able to be calculated by the same method as that in step S215 in FIG. 9 described later.

Next, the processor 10*a* obtains a printing speed of the printer (step S140). That is to say, the processor 10*a* obtains the printing speed when the selected printer performs batch printing with the selected print setting. A printing speed is, for example, a printing time required for printing a unit area of the medium.

Next, the processor 10*a* calculates the time when the consumables run out (step S145). In the present embodiment, the processor 10*a* calculates a time period required from the time of starting batch printing to the time when the print job previous to the print job that causes the consumables to run out, which is calculated in step S135, completes printing. More specifically, the processor 10*a* calculates a print area to be printed by the consecutive jobs from the first job in the batch printing to the print job previous to the print job that causes the consumables to run out, and divides the print area by the printing speed obtained in step S140 to calculate the time required.

In this regard, after the processing in step S145 is completed, or when the print setting is determined as a print setting enabled to perform batch printing in step S130, the processor 10*a* generates display data of a print confirmation dialog and transmits the display data to the terminal 20. Upon receiving the display data of the print confirmation dialog, the processor 20*a* of the terminal 20 displays the print confirmation dialog (step S150). The print confirmation dialog is a screen for causing the user to confirm the contents of the batch printing and to give the final execution instruction.

Figure 8:
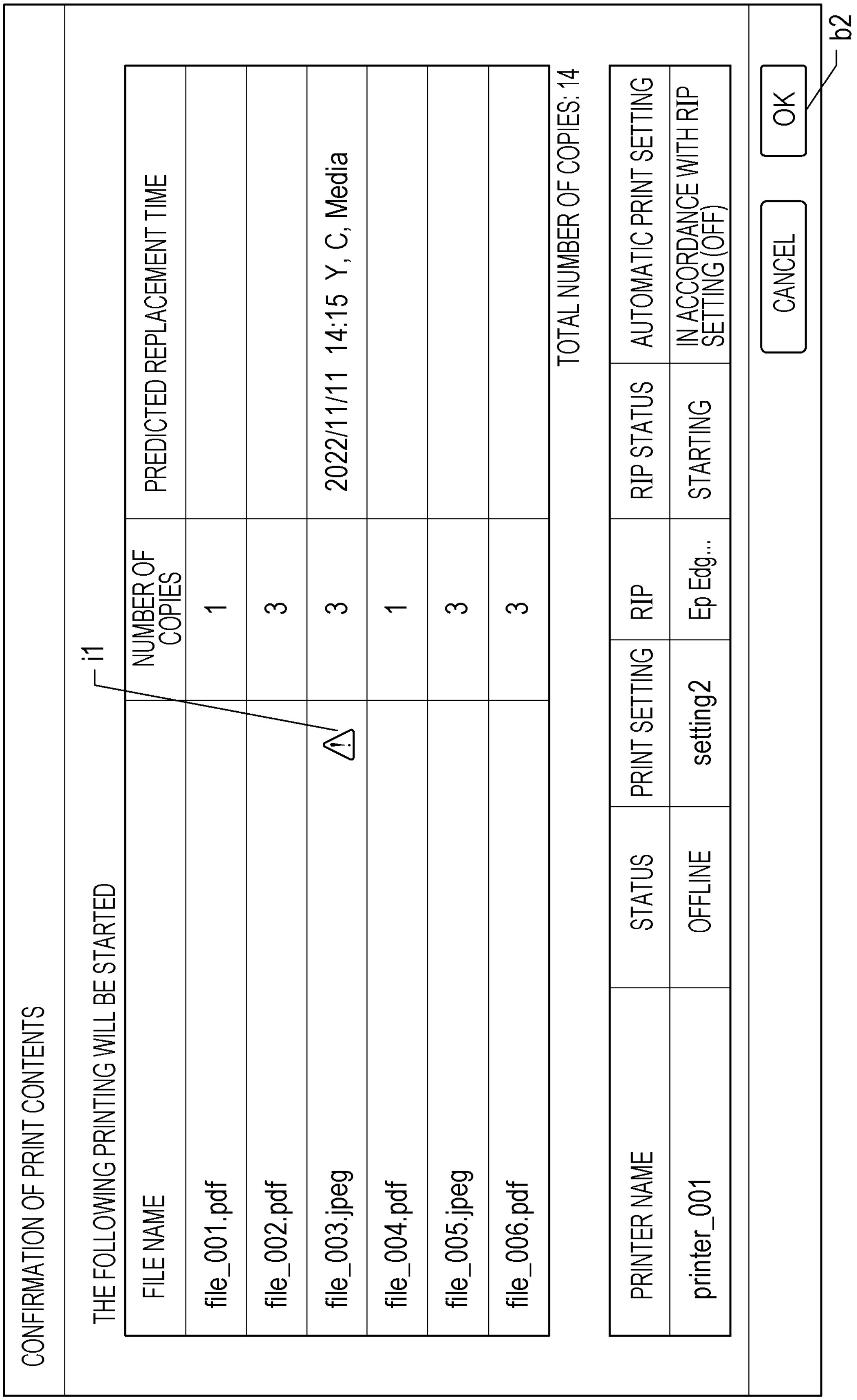
FIG. 8 is a diagram illustrating an example of a print confirmation dialog.

FIG. 8 is a diagram illustrating an example of the print confirmation dialog. In the print confirmation dialog, a list of a plurality of files to be printed in batch are arranged in the processing order of the printing. Also, in association with the file corresponding to the print job that causes the consumables to run out, an icon i1 indicating that is displayed. Also, in association with the file, a predicted replacement time of the consumables is displayed. A predicted replacement time is calculated by adding the time required, which is calculated in step S145, to the current time. In the present embodiment, a predicted replacement time is a predicted time when the job previous to the job that causes consumables to run out completes printing. Also, the type of the consumables to be replaced at the predicted replacement time is displayed. From the result of the processing in step S135, it is possible to identify the type of the consumables to be replaced. Also, in the print confirmation dialog, the selected printer and print setting are displayed. When the user confirms and accepts the contents of the print confirmation dialog, the user is able to start batch printing by selecting an OK button b2.

In this manner, in the present embodiment, it is possible to visualize the time for replacing the consumables and guide the user. Accordingly, the user is able to make a correct operation plan. Also, it becomes unnecessary for the user to manually calculate the consumable consumption, and thus it is possible to reduce the user load. Also, it is possible to replace the consumables at the stage in which the job previous to the job that causes the consumables to run out is completed, and thus it is possible to reduce the loss of the consumables such as ink, a medium, and the like.

Upon receiving the selection of the OK button b2 in the print confirmation dialog (step S155), the processor 20*a* of the terminal 20 transmits an instruction to start the batch printing with the contents of the print confirmation dialog to the server 10.

Upon receiving the instruction to start the batch printing with the contents of the print confirmation dialog, the processor 10*a* of the server 10 determines whether or not the batch printing is possible without replacing the consumables (step S160). When it is not determined that the batch printing is possible, the processor 10*a* sets whether or not to give a notification of the consumable replacement time (step S165). That is to say, when the notification setting set by the user in the print setting dialog illustrated in FIG. 7 is on, the processor 10a sets a time to transmit the notification of the consumable replacement to the smartphone. When the notification setting is not set on by the user, the processing of step S165 is skipped.

Next, the processor 10a instructs to perform printing up to the job previous to the job that causes the consumables to run out (step S170). That is to say, the processor 10a transmits up to the print job previous to the print job that causes the consumables to run out to the selected printer 30 and instructs to perform printing. The processor 10a waits until the replacement of the consumables is completed (step S175). That is to say, the processor 10a causes the terminal 20 and the smartphone not illustrated in the figure to display a notification prompting the replacement of the consumables at the time set in step S165 or at the time when the print job previous to the print job that causes the consumables to run out is actually completed. The processor 10a waits until the user replaces the consumables, and the completion of the replacement is transmitted from the printer 30. When the consumables are replaced, the processor 10a instructs the printer to perform printing of the remaining jobs (step S180). As a result, the printer is able to execute the printing of the remaining print jobs.

In this regard, when it is determined that the batch printing is possible without replacing the consumables in step S160, the processor 10a instructs the printer 30 to print all the jobs in sequence. As a result, the printer 30 performs the print jobs of a plurality of print files in batch. Next, a description will be given of the batch print determination processing in step S110.

Figure 9:
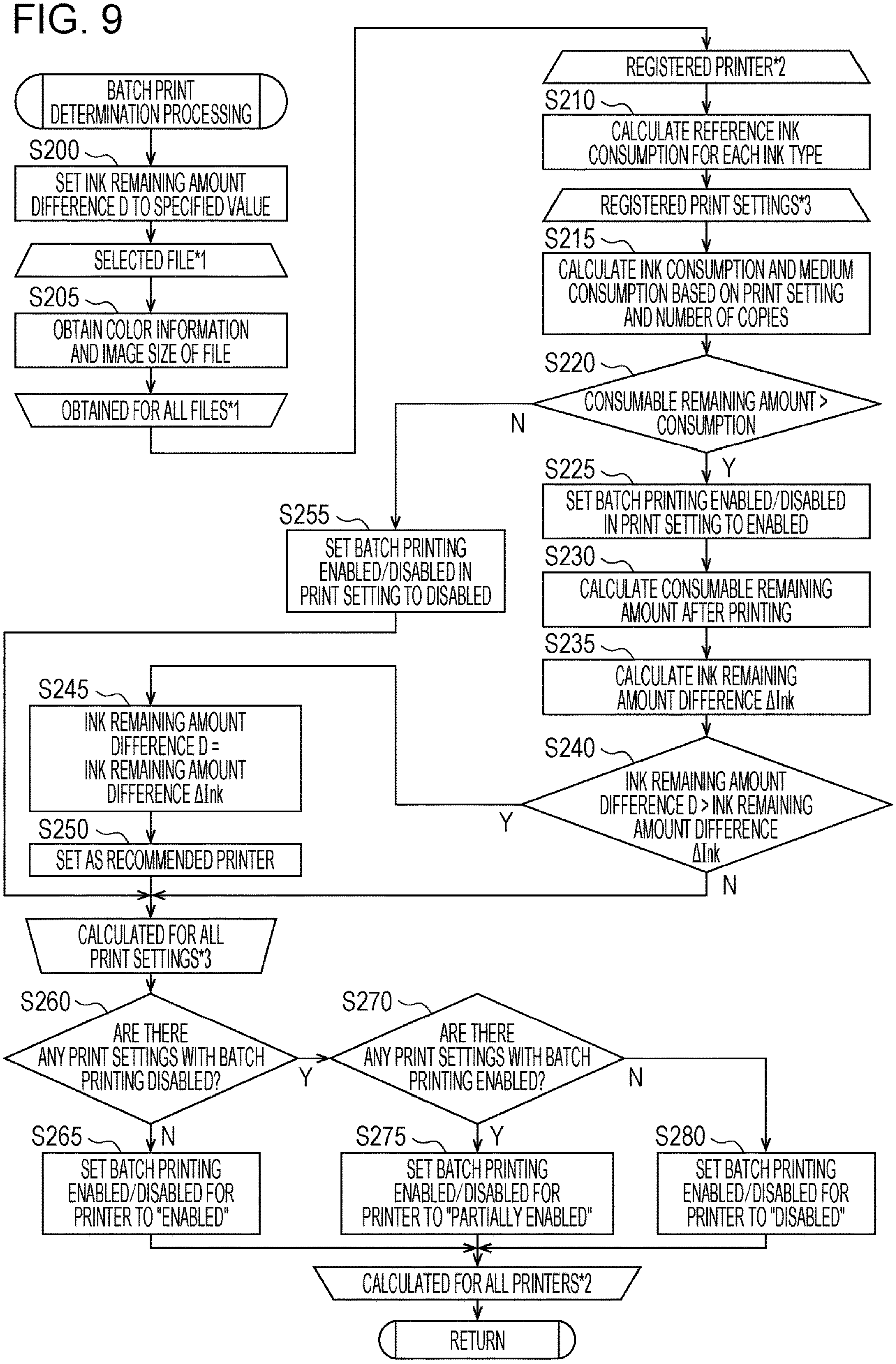
FIG. 9 is a flowchart of the batch print determination processing.

FIG. 9 is a flowchart illustrating the batch print determination processing. When the batch print determination processing is started, the processor 20a sets a remaining ink amount difference D to a specified value (step S200). That is to say, the remaining ink amount difference D is initialized by a specified value. The specified value is a predetermined value as a threshold value for determining whether or not the ink remaining amount for each ink type after printing has little variation. The remaining ink amount difference D is a variable for holding a minimum value of a remaining ink amount difference ΔInk described later. Next, as illustrated by *1 in FIG. 9, the processor 20a performs the processing in step S205 for one file at a time of all the selected files. In step S205, the processor 10a obtains the color information and the image size of the file to be processed. Specifically, the processor 10a performs rendering on the file to be processed in accordance with the image size and obtains a pixel value (RGB) of each pixel.

When the processing in step S205 is completed for all the selected files, the processor 10a performs the processing from step S210 to step S280 for each one printer of all the registered printers as illustrated by *2. First, the processor 10a calculates a reference ink consumption for each ink type in step S210. Specifically, the processor 10a converts the pixel value of each pixel for each file to an ink consumption for each ink type to be used by the printer to be processed when printing is performed on the printing conditions to be a reference, and uses the ink consumption as a reference ink consumption for each ink type for each file. The printing conditions to be a reference are, for example, the output size: A4 size, the medium type: plain paper, and the print quality: standard.

Next, as illustrated by *3, the processor 10a performs the processing from step S215 to step S255 for each one of the registered print settings. First, in step S215, the processor 10a calculates an ink consumption and a medium consumption based on the print setting and the number of copies, and the like. Specifically, the processor 10a multiplies the reference ink consumption for each ink type of the file by a coefficient in accordance with the output size, the print quality, and the medium type for each file. Further, by multiplying by the number of copies, the processor 10a calculates the ink consumption for each ink type for each print job for each file. The processor 10a adds the ink consumption for each print job for each file for each ink type so as to calculate the ink consumption for each ink type required for printing a plurality of files. Also, the processor 10a calculates a medium consumption for each print job and for each file based on the output size and the number of copies, and adds the medium consumption by the print jobs for a plurality of files to calculate the medium consumption required for printing the plurality of files.

Next, the processor 10a determines whether or not the consumable remaining amount is larger than the consumption (step S220). That is to say, the processor 10a determines whether or not the ink remaining amount for each ink type of the printer to be processed is larger than the ink consumption for each ink type calculated in step S215, and determines whether or not the medium remaining amount of the printer to be processed is larger than the medium consumption calculated in step S215. In this regard, the processor 10a obtains the medium remaining amount and the ink remaining amount for each ink type of the printer to be processed by referring to the printer information 10c5. When the printer to be processed includes a print job being printed, or a print job waiting to be executed before the batch printing for which enabled or disabled is under consideration in FIG. 9, the processor 10a calculates the ink consumption for each ink type and the medium consumption after the completion of those print jobs, and uses them for the determination in step S220.

In step S220, when the consumable remaining amount is not determined to be larger than the consumption, the processor 10a sets the batch printing enabled or disabled in the print setting to be processed to disabled (step S255). That is to say, when the ink remaining amount for each ink type of the printer to be processed is larger than the ink consumption for each ink type calculated in step S215, and the medium remaining amount of the printer to be processed is larger than the medium consumption calculated in step S215, the determination processing proceeds to Y in step S220, whereas the determination processing proceeds to N in the other cases.

In step S220, when the consumable remaining amount is determined to be larger than the consumption, the processor 10a sets the batch printing enabled or disabled in the print setting to be processed to enabled (step S225). FIG. 6 is a diagram illustrating that the batch printing enabled or disabled is determined for each print setting and for each printer, and the sign indicating whether enabled or disabled is kept. In step S225, the processor 10a sets the batch printing enabled or disabled of the print setting to be processed of the printer to be processed to "enabled".

Next, the processor 10a calculates the consumable remaining amount after printing (step S230). That is to say, the processor 10a calculates the ink remaining amount for each ink type and the medium remaining amount after printing when printing is performed of a plurality of files to be printed in batch by using the printer to be processed with the print setting to be processed. Specifically, the processor 10a subtracts the consumption from the consumable remaining amount in step S220 so as to calculate the ink remaining amount for each ink type and the medium remaining amount after printing.

Next, the processor 10*a* calculates the remaining ink amount difference ΔInk (step S235). The remaining ink amount difference ΔInk becomes a larger value when the difference between the average value of the ink remaining amount for each ink type after printing and the ink remaining amount for each ink type is large than when the difference is small. The processor 10*a* calculates the remaining ink amount difference ΔInk, for example, by the expression for calculating a variance, which is illustrated by an expression (1).

$$\Delta Ink = \frac{1}{N}\sum_{i=1}^{N}\left(Ink_{after_i} - \overline{Ink_{after}}\right)^2 \tag{1}$$

$$Ink_{after_i} = Ink_{before_i} - Ink_{use_i} \tag{2}$$

In expressions (1) and (2), i is the number for distinguishing an ink type, N is the number of ink types, $Ink_{after}$ is the ink remaining amount after printing, $Ink_{before}$ is the ink remaining amount before printing (refer to S220), and $Ink_{use}$ is the estimated ink consumption (refer to S215).

Next, the processor 10*a* determines whether or not the remaining ink amount difference D is larger than the remaining ink amount difference ΔInk calculated in step S235 (step S240). In step S240, when the remaining ink amount difference D is determined to be larger than the remaining ink amount difference ΔInk calculated in step S235, the processor 10*a* updates the remaining ink amount difference D by the remaining ink amount difference ΔInk calculated in step S235 (step S245). That is to say, the remaining ink amount difference D is updated to the minimum value at this point in time.

Next, the processor 10*a* sets the printer to be processed as a recommended printer (step S250). When a new printer is set as a recommended printer in step S250, the printer set as a recommended printer up to that time is removed from the recommended printer. In this manner, a printer and a print setting are identified by which the variation in the ink remaining amount for each ink type after printing is smaller than the specified value in step S200 and is the smallest. That is to say, in the present embodiment, a printer which is able to perform printing with the print setting by which the variation in the ink remaining amount for each ink type after printing becomes smallest is identified as a recommended printer. The ink remaining amount after printing becomes uniform, and thus it is possible to synchronize the replacement time of the installed ink and to reduce the work load. Accordingly, in the present embodiment, the processing is performed to identify a printer (and the print setting), by which the variation in the ink remaining amount after printing is smaller than the specified value in step S200 and the variation is the smallest, as a recommended printer.

In this regard, when the ink consumption of a specific ink type has a tendency to become noticeably higher than those of the other ink types, the replacement time of the specific ink type may be thought independently from the replacement time of the other ink types. The specific ink type may be, therefore, excluded from the expression (1), for example.

Also, for example, as in expression (3), a value calculated by multiplying the ink remaining amount after printing by a weight coefficient $k_i$ in accordance with the ink type may be assigned to the expression (1).

$$Ink_{after_i} = k_i\left(Ink_{before_i} - Ink_{use_i}\right) \tag{3}$$

For example, the weight coefficient $k_I$ for a specific ink type I that has a tendency for faster consumption speed than those of the other ink types may be set smaller than the weight coefficients of the other ink types. As a result, it is possible to make the ink remaining amount of the specific ink type after printing less likely to affect the identification of a recommended printer based on the ink remaining amounts of the other ink types (the specific ink type is regarded to be replaced independently from the replacement time of the other ink types).

When the processing from step S215 to step S255 is completed for all the print settings registered for the printer to be processed, the processor 10*a* determines whether or not there are print settings with batch printing disabled by the function of the determination section 10*a*4 (step S260). When it is not determined that there is a print setting described above in step S260, the processor 10*a* sets the batch printing enabled or disabled of the printer to be processed to "enabled" by the function of the notification section 10*a*5 (step S265). In the print setting dialog illustrated in FIG. 7, which is displayed by the processing of step S115 in FIG. 5, the batch printing enabled is indicated by a circle mark.

When it is determined that there is a print setting described above in step S260, the processor 10*a* determines whether or not there are print settings with batch printing enabled by the function of the determination section 10*a*4 (step S270). When it is determined that there is a print setting described above in step S270, the processor 10*a* sets the batch printing enabled or disabled of the printer to be processed to "partially enabled" by the function of the notification section 10*a*5 (step S275). In the print setting dialog illustrated in FIG. 7, which is displayed by the processing in step S115 in FIG. 5, the batch printing partially enabled is indicated by a triangle mark. When it is not determined that there is a print setting described above in step S270, the processor 10*a* sets the batch printing enabled or disabled of the printer to be processed to "disabled" by the function of the notification section 10*a*5 (step S280). In the print setting dialog illustrated in FIG. 7, which is displayed by the processing in step S115 in FIG. 5, the batch printing disabled is indicated by a cross mark. When the processing from step S210 to S280 is completed for all the registered printers, the processor 10*a* ends the batch print determination processing.

3. Other Embodiments

The embodiment described above is an example for carrying out the present disclosure, and various other embodiments may be employed. For example, the consumables targeted by the present disclosure may include consumables other than ink or a medium. For example, it is possible to apply the present disclosure to the consumables that need to be replaced every time a certain amount of printing is performed. Specifically, for example, waste ink box, head, toner, waste toner box, parts of the transport mechanism for a medium (roller, belt, and the like), and the like may be assumed.

The notification section only needs to be able to give a notification based on a determination result of the batch printing enabled or disabled without replacing the consumables to the user. The notification mode is not limited to the mode described in the above embodiment. For example, in the display of a list of printers, a notification may be given such that an icon or the like indicating only a printer enabled to perform batch printing without replacing the consumables may be displayed. Alternatively, in the display of a list of printers, a notification may be given such that an icon or the like indicating only a printer disabled to perform batch printing without replacing the consumables may be displayed. Also, a notification may be given such that a printer enabled to perform batch printing without replacing the consumables may be extracted from all the printers, or a notification may be given such that a printer disabled to perform batch printing without replacing the consumables may be extracted from all the printers.

For the identification of a recommended printer to perform batch printing, various methods other than the method which is described in the above embodiment and based on the variation in the remaining ink amount for each ink type may be assumed. Specifically, for example, upon receiving a request to perform a medium replacement work in a specific period or not in a specific period due to the convenience of the user operation, or the like, a recommended printer may be identified so as to meet the request. In addition, it is possible to identify a printer that meets the various conditions provided for a recommended printer in advance and guide it as a recommended printer.

In the embodiment described above, when replacement of the consumables becomes necessary in the middle of the batch printing, the replacement is prompted after completion of the print job previous to the print job that causes the consumables to run out. However, the replacement time may be any other timing. For example, a description will be continued on the assumption that when the medium is cut paper, one sheet of cut paper is determined to be a unit of paper to print, whereas when the medium is roll paper, a range of paper to be divided and cut after printing is determined to be a unit of paper to print. Printing may be performed such that after starting the print job that causes the consumables to run out, printing is stopped at a unit of paper to print previous to the unit of paper to print estimated to cause the consumables to run out, and the replacement work is carried out. In this manner, it is possible to further reduce the loss of the consumables.

In the embodiment described above, when a printer and a print setting that need replacement of the consumables is selected, in the print confirmation dialog in FIG. 8, a file corresponding to the print job that causes the consumables to run out is notified. However, for example, a file corresponding to the print job that causes the consumables to run out may be notified in the same manner in the print setting dialog in FIG. 7. Specifically, for example, when a print setting (a print setting that needs replacement of the consumables in the middle) that is displayed in grayed out is tapped or receives a mouse hover action on a list $L_3$ of print settings for a printer, the icon i1 (refer to FIG. 8) may be displayed on the file that causes the consumables to run out. After that, when a print setting (print setting enabled to perform batch printing without replacement) that is not grayed out is tapped or receives a mouse hover action again, the icon i1 is hidden.

Further, it is possible to apply the present disclosure as a program or a method performed by a computer. For example, the present disclosure is realized as a non-transitory computer-readable storage medium storing a print control program, the print control program causing a computer to perform functions including: an instruction reception section configured to receive an instruction to perform batch printing of a plurality of print files; a calculation section configured to calculate a predicted consumption of consumables required for batch printing of the plurality of print files based on the plurality of print files; a consumable remaining amount acquisition section configured to obtain a consumable remaining amount from a printer; a determination section configured to determine whether or not it is possible to perform batch printing without replacing the consumables based on the predicted consumption and the consumable remaining amount; and a notification section configured to give a notification based on a determination result to a user.

Further, the present disclosure is realized as a print control method including: receiving an instruction to perform batch printing of a plurality of print files; calculating a predicted consumption of consumables required for batch printing of the plurality of print files; obtaining a consumable remaining amount from a printer; determining whether or not it is possible to perform batch printing without replacing the consumables based on the predicted consumption and the consumable remaining amount; and giving a notification based on a determination result to a user.

Further, the present disclosure is realized as a printing system including the print control apparatus described above, a printer that obtains a consumable remaining amount and returns the consumable remaining amount in accordance with control of the print control apparatus, and a terminal that performs display in accordance with information transmitted from the print control apparatus and transmits an instruction input by a user to the print control apparatus.

Also, the above-described system, program, and method may be realized as a single device, or realized by using a part included in a plurality of devices, and may include various modes. Also, it is possible to suitably change a part of the disclosure; for example, one part may be software and another part may be hardware. Further, the disclosure may be realized as a recording medium of a program controlling a system. Of course, the program recording medium may be considered to be a magnetic recording medium, a semiconductor memory, or any recording medium to be developed in the future in the same manner.

What is claimed is:

1. A print control apparatus comprising:

a processor configured to:

receive an instruction to perform batch printing of a plurality of print files;

calculate, based on the plurality of print files, a predicted consumption of consumables required for the batch printing of the plurality of print files;

obtain a consumable remaining amount from a printer;

determine, based on the predicted consumption and the consumable remaining amount, whether or not it is possible to perform the batch printing without replacing the consumables;

provide, based on a determination result of the determination. a notification to a user:

when the processor determines that the consumable remaining amount will become insufficient during the batch printing and that replacement of the consumables is required, provide an advance notification that the replacement of the consumables will occur during the batch printing;

transmit, to the printer, a print instruction for print files printable before the replacement among the plurality of print files, and cause the printer to start the batch printing;

provide a notification to the user to perform the replacement, after printing of the print files printable before the replacement is completed; and transmit, to the printer, a print instruction for remaining print files after the replacement of the consumables.

2. The print control apparatus according to claim 1, wherein the processor is further configured to:

identify the printer recommended from a plurality of printers based on the consumable remaining amount and the predicted consumption of each of the plurality of printers; and output a notification of the identified printer to the user.

3. The print control apparatus according to claim 2, wherein the processor is further configured to identify, as the recommended printer, the printer having less variation in ink remaining amount of each ink type after the batch printing.

4. The print control apparatus according to claim 1, wherein the processor is further configured to:

determine whether or not the batch printing is possible for each of a plurality of print settings; and output a notification to the user of a determination result for each of the plurality of print settings.

5. A printing system comprising:

a print control apparatus;

a printer that obtains a consumable remaining amount and returns the consumable remaining amount in accordance with control of the print control apparatus; and a terminal that performs display in accordance with information transmitted from the print control apparatus and transmits to the print control apparatus an instruction input by a user, wherein the print control apparatus includes a processor that is configured to:

receive an instruction, transmitted from the terminal, to perform batch printing of a plurality of print files, calculate, based on the plurality of print files, a predicted consumption of consumables required for the batch printing of the plurality of print files, obtain the consumable remaining amount from the printer, determine, based on the predicted consumption and the consumable remaining amount, whether or not it is possible to perform the batch printing without replacing the consumables, transmit to the terminal a notification based on a determination result of the determination, when the processor determines that the consumable remaining amount will become insufficient during the batch printing and that replacement of the consumables is required, transmit an advance notification that the replacement of the consumables will occur during the batch printing, transmit, to the printer. a print instruction for print files printable before the replacement among the plurality of print files, and cause the printer to start the batch printing, transmit a notification to the terminal to perform the replacement, after printing of the print files printable before the replacement is completed, and transmit, to the printer, a print instruction for remaining print files after the replacement of the consumables.

6. A print control method comprising:

receiving an instruction to perform batch printing of a plurality of print files;

calculating, by a processor, based on the plurality of print files, a predicted consumption of consumables required for the batch printing of the plurality of print files;

obtaining, by the processor, a consumable remaining amount from a printer;

determining, by the processor, based on the predicted consumption and the consumable remaining amount, whether or not it is possible to perform the batch printing without replacing the consumables;

providing, by the processor, a notification to a user based on a determination result of the determination;

when the processor determines that the consumable remaining amount will become insufficient during the batch printing and that replacement of the consumables is required, providing, by the processor, an advance notification that the replacement of the consumables will occur during the batch printing;

transmitting, to the printer, a print instruction for print files printable before the replacement among the plurality of print files, and cause the printer to start the batch printing;

providing, by the processor, a notification to the user to perform the replacement, after printing of the print files printable before the replacement is completed; and transmitting, to the printer, a print instruction for remaining print files after the replacement of the consumables.

7. A non-transitory computer-readable storage medium storing a print control program, the print control program causing a computer to perform functions comprising:

receiving an instruction to perform batch printing of a plurality of print files;

calculating, by a processor, based on the plurality of print files, a predicted consumption of consumables required for the batch printing of the plurality of print files;

obtaining, by the processor, a consumable remaining amount from a printer;

determining, by the processor, based on the predicted consumption and the consumable remaining amount, whether or not it is possible to perform the batch printing without replacing the consumables;

providing, by the processor, notification to a user based on a determination result of the determination;

when the processor determines that the consumable remaining amount will become insufficient during the batch printing and that replacement of the consumables is required, providing, by the processor, an advance notification that the replacement of the consumables will occur during the batch printing;

transmitting, to the printer, a print instruction for print files printable before the replacement among the plurality of print files, and cause the printer to start the batch printing:

providing, by the processor, a notification to the user to perform the replacement, after printing of the print files printable before the replacement is completed; and transmitting, to the printer, a print instruction for remaining print files after the replacement of the consumables.

* * * * *